United States Patent
Liu et al.

(10) Patent No.: US 12,073,600 B2
(45) Date of Patent: Aug. 27, 2024

(54) METHOD AND APPARATUS FOR DETECTING KEYPOINTS OF HUMAN BODY, ELECTRONIC DEVICE AND STORAGE MEDIUM

(71) Applicant: SHENZHEN SENSETIME TECHNOLOGY CO., LTD., Shenzhen (CN)

(72) Inventors: Wentao Liu, Shenzhen (CN); Yujing Guo, Shenzhen (CN); Yongwang Wang, Shenzhen (CN); Chen Qian, Shenzhen (CN); Jiahua Li, Shenzhen (CN)

(73) Assignee: SHENZHEN SENSETIME TECHNOLOGY CO., LTD., Guangdong (CN)

( * ) Notice: Subject to any disclaimer, the term of this patent is extended or adjusted under 35 U.S.C. 154(b) by 413 days.

(21) Appl. No.: 17/507,850

(22) Filed: Oct. 22, 2021

(65) Prior Publication Data
US 2022/0044056 A1 Feb. 10, 2022

Related U.S. Application Data

(63) Continuation of application No. PCT/CN2020/080231, filed on Mar. 19, 2020.

(30) Foreign Application Priority Data

Jul. 15, 2019 (CN) .......................... 201910635763.6

(51) Int. Cl.
*G06V 10/46* (2022.01)
*G06F 18/25* (2023.01)
(Continued)

(52) U.S. Cl.
CPC ............ *G06V 10/462* (2022.01); *G06F 18/25* (2023.01); *G06N 3/08* (2013.01); *G06V 10/24* (2022.01); *G06V 40/10* (2022.01)

(58) Field of Classification Search
None
See application file for complete search history.

(56) References Cited

U.S. PATENT DOCUMENTS

| 11,074,711 B1* | 7/2021 | Akbas ................. G06V 10/454 |
| 2011/0211754 A1* | 9/2011 | Litvak ................. G06V 40/107 382/165 |
| 2019/0130602 A1 | 5/2019 | Hall et al. |

FOREIGN PATENT DOCUMENTS

| CN | 107690650 A | 2/2018 |
| CN | 108230383 A | 6/2018 |

(Continued)

OTHER PUBLICATIONS

International Search Report in the international application No. PCT/CN2020/080231, mailed on Jun. 28, 2020, 2 pgs.
(Continued)

*Primary Examiner* — Leon Flores
(74) *Attorney, Agent, or Firm* — Cooper Legal Group, LLC (57) ABSTRACT

A method and an apparatus for detecting key points of a human body, and a storage medium are provided. The method includes: extracting, in response to detecting that an image comprises a body, two-dimensional (2D) coordinate data for identifying body keypoint positions in the image to obtain 2D pose data; and performing body keypoint feature fusion on the 2D pose data and depth data corresponding to the body keypoint positions to obtain three-dimensional (3D) pose data for identifying the body keypoint positions.

15 Claims, 9 Drawing Sheets

S101

In response to detecting that an image includes a body, 2D coordinate data for identifying body keypoint positions are extracted in the image to obtain 2D pose data

S102

Body keypoint feature fusion is performed on the 2D pose data and depth data corresponding to the body keypoint positions to obtain 3D pose data for identifying the body keypoint positions (51) Int. Cl.
*G06N 3/08* (2023.01)
*G06V 10/24* (2022.01)
*G06V 40/10* (2022.01)

(56) References Cited

FOREIGN PATENT DOCUMENTS

| | | |
|---|---|---|
| CN | 108460338 A | 8/2018 |
| CN | 108564041 A | 9/2018 |
| CN | 108830150 A | 11/2018 |
| CN | 108960036 A | 12/2018 |
| CN | 109176512 A | 1/2019 |
| CN | 109583370 A | 4/2019 |
| CN | 109584362 A | 4/2019 |
| CN | 110348524 A | 10/2019 |
| JP | 2019028509 A | 2/2019 |
| KR | 101392357 B1 | 5/2014 |

OTHER PUBLICATIONS

First Office Action of the Chinese application No. 201910635763.6, issued on Dec. 28, 2020, 15 pgs.
Second Office Action of the Chinese application No. 201910635763.6, issued on Jun. 4, 2021, 17 pgs.
Third Office Action of the Chinese application No. 201910635763.6, issued on Aug. 30, 2021, 12 pgs.
First Office Action of the Japanese application No. 2021-564295, issued on Sep. 5, 2022, 5 pgs.
English translation of the Written Opinion of the International Search Authority in the international application No. PCT/CN2020/080231, mailed on Jun. 28, 2020, 5 pgs.

* cited by examiner

METHOD AND APPARATUS FOR DETECTING KEYPOINTS OF HUMAN BODY, ELECTRONIC DEVICE AND STORAGE MEDIUM

CROSS-REFERENCE TO RELATED APPLICATIONS

This application is a continuation of International Patent Application No. PCT/CN2020/080231, filed on Mar. 19, 2020, which claims priority to Chinese Patent Application No. 201910635763.6, filed on Jul. 15, 2019. The disclosures of International Patent Application No. PCT/CN2020/080231 and Chinese Patent Application No. 201910635763.6 are hereby incorporated by reference in their entireties.

BACKGROUND

In related art, the body keypoint detection technology is an application developed based on a deep learning algorithm. Along with continuous improvement of computing power of computers and continuous expansion of datasets, the deep learning algorithm is applied to all walks of life as an important sector of the machine learning. However, for application scenarios such as motion sensing games and body dynamic monitoring, there is still no efficient solution concerning how to implement accurate detection of keypoints of a human body when the human body is in a motion state.

SUMMARY

The present disclosure relates to the technical field of body detection, and more particularly to a method and an apparatus for detecting body keypoints, an electronic device and a storage medium.

The present disclosure provides technical solutions for detection of keypoints of a human body.

According to an aspect of the present disclosure, a method for detecting body keypoints is provided, which may include the following operations. In response to detecting that an image includes a body, two-dimensional (2D) coordinate data for identifying body keypoint positions in the image are extracted to obtain 2D pose data. Body keypoint feature fusion is performed on the 2D pose data and depth data corresponding to the body keypoint positions to obtain three-dimensional (3D) pose data for identifying the body keypoint positions.

According to an aspect of the present disclosure, an apparatus for detecting body keypoints is provided, which may include: a detection module, and a fusion module. The detection module is configured to extract, in response to detecting that an image includes a body, 2D coordinate data for identifying body keypoint positions in the image to obtain 2D pose data. The fusion module is configured to perform body keypoint feature fusion on the 2D pose data and depth data corresponding to the body keypoint positions to obtain 3D pose data for identifying the body keypoint positions.

According to an aspect of the present disclosure, an electronic device is provided, which may include: a processor and a memory. The memory is configured to store instructions executable by the processor. The processor is configured to: execute the method for detecting body keypoints as mentioned above.

According to an aspect of the present disclosure, a computer-readable storage medium is provided, which stores computer program instructions thereon; and the computer program instruction is executed by a processor to execute the method for detecting body keypoints as mentioned above.

According to an aspect of the present disclosure, a computer program is provided, which may include a computer-readable code; and the computer-readable code, when running in an electronic device, enables a processor in the electronic device to execute the method for detecting body keypoints as mentioned above.

BRIEF DESCRIPTION OF THE DRAWINGS

The accompanying drawings, which are incorporated in and constitute a part of this specification, illustrate embodiments consistent with the disclosure and, together with the description, serve to explain the principles of the present disclosure.

DETAILED DESCRIPTION

Various exemplary embodiments, features and aspects of the disclosure will be described below in detail with reference to the accompanying drawings. A same numeral in the accompanying drawings indicates a same or similar component. Although various aspects of the embodiments are illustrated in the accompanying drawings, the accompanying drawings are unnecessarily drawn according to a proportion unless otherwise specified.

As used herein, the word "exemplary" means "serving as an example, instance, or illustration". Thus, any embodiment described herein as "exemplary" is not necessarily to be construed as preferred or advantageous over other embodiments.

The term "and/or" in this specification is only an association relationship for describing associated objects and represents that three relationships may exist. For example, A and/or B may represent the following three cases: only A exists, both A and B exist, and only B exists. In addition, the term "at least one type" herein represents any one of multiple types or any combination of at least two types in the multiple types, for example, at least one type of A, B and C may represent any one or multiple elements selected from a set formed by the A, the B and the C.

In addition, for describing the disclosure better, many specific details are presented in the following specific implementation modes. It is to be understood by those skilled in the art that the disclosure may still be implemented even without some specific details. In some examples, methods, means, components and circuits known very well to those skilled in the art are not described in detail, to highlight the subject of the disclosure.

The body keypoint detection technology is an application developed based on a deep learning algorithm. The deep learning algorithm develops rapidly and has received widespread attentions. Along with continuous improvement of computing power of computers and continuous expansion of datasets, the deep learning algorithm is applied to all walks of life as an important branch of the machine learning. In the field of computer visions, the deep learning even becomes a key technology in the industry because of excellent computing power and high robustness. Key features in images may be effectively extracted through a Convolutional Neural Network (CNN) in the deep learning. There are problems in the conventional fully-connected neutral networks that the number of parameters is large, position information between pixels is not utilized, and the network depth is limited (the greater the depth, the stronger the expressive ability; and then, the training parameters are also increased massively). The CNN solves these problems well. First of all, connections in the CNN are local connection; and each neuron is not connected to at least one neuron on an upper layer, but connected to a small part of neurons. Meanwhile, a group of connections may share the same weight parameter; and with a down-sampling strategy, the number of parameters is reduced to a great extent. Different from one-dimensional arrangement of the fully-connected network, neuron structures of the CNN are arranged in a 3D manner. By removing a great number of unimportant parameters and keeping important weight values, a deep neutral network is achieved, and thus more information with a higher complexity can be processed.

In light of restrictions of 2D body keypoints at an application level, 3D coordinates cannot be obtained. Such a defect may be remedied through a 3D approach, but if predicted 3D keypoints are output only based on RGB data, the accuracy of the detection solution is low. The 3D approach has input and fusion of depth data, which allows outputting more accurate 3D coordinate points. However, if corresponding 3D keypoints are output only based on the depth data, the approach may be greatly limited by the quality of a DepthMap in the hardware.

Through the body keypoint detection solution of the present disclosure, 3D coordinates predicted based on RGB data are fused with depth data, such that the reliance on accuracy that 3D hardware module collects the depth data may be effectively reduced, thereby achieving better detection accuracy and robustness.

Figure 1:
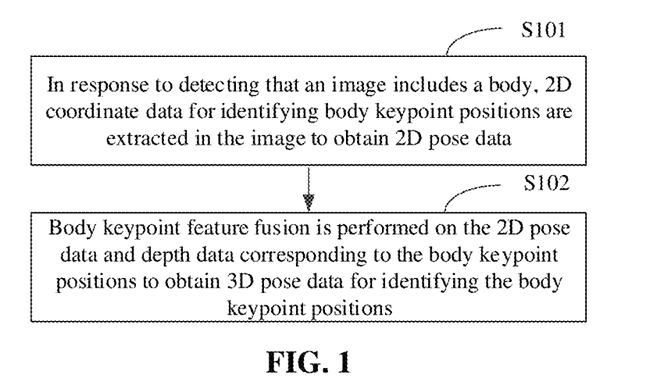
FIG. 1 illustrates a flowchart of a method for detecting body keypoints according to an embodiment of the present disclosure.

FIG. 1 illustrates a flowchart of a method for detecting body keypoints according to an embodiment of the present disclosure. The method for detecting body keypoints is applied to anon apparatus for detecting body keypoints. For example, the apparatus for detecting body keypoints may be executed by a terminal device or a server or other processing devices. The terminal device may be User Equipment (UE), a mobile device, a cell phone, a cordless phone, a Personal Digital Assistant (PDA), a handheld device, a computing device, a vehicle-mounted device, a wearable device, etc. In some possible implementation modes, the method for detecting body keypoints may be implemented by a processor by invoking computer-readable instructions stored in a memory. As shown in FIG. 1, the process may include the following steps.

In S101, in response to detecting that an image includes a body, 2D coordinate data for identifying body keypoint positions are extracted in the image to obtain 2D pose data.

In S102, body keypoint feature fusion is performed on the 2D pose data and depth data corresponding to the body keypoint positions, to obtain 3D pose data for identifying the body keypoint positions.

Through the present disclosure, the 3D pose data may be obtained by fusing the 2D pose data and depth data. The 2D pose data are 2D coordinates of body keypoints in an RGB image, and the 3D pose data are 3D body keypoints. By means of the 3D pose data, detection of keypoints of a human body may be performed accurately when the human body is in a motion state. For example, a motion state is decomposed into at least one node pose of raising a hand, kicking a leg, shaking a head or bending down, so that body keypoint detection corresponding to these node poses is tracked in real time.

Figure 2:
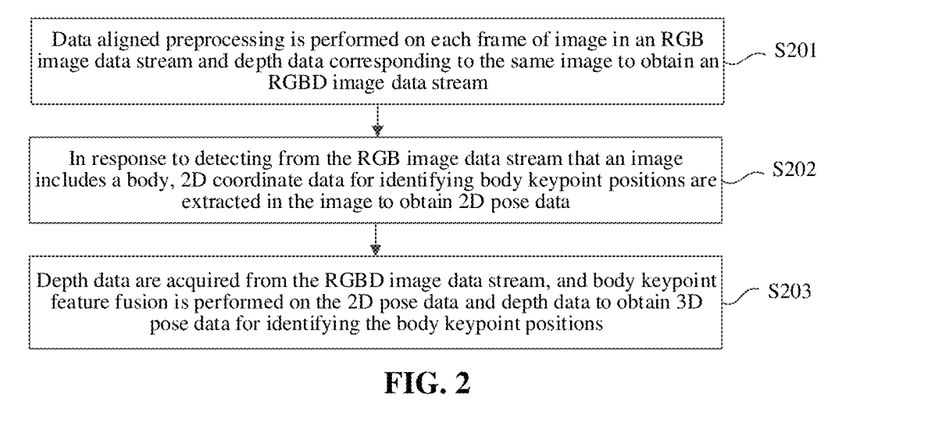
FIG. 2 illustrates a flowchart of a method for detecting body keypoints according to an embodiment of the present disclosure.

FIG. 2 illustrates a flowchart of a method for detecting body keypoints according to an embodiment of the present disclosure. The method for detecting body keypoints is applied to an apparatus. For example, the apparatus for detecting body keypoints may be executed by a terminal device or a server or other processing devices. The terminal device may be User Equipment (UE), a mobile device, a cell phone, a cordless phone, a Personal Digital Assistant (PDA), a handheld device, a computing device, a vehicle-mounted device, a wearable device, etc. In some possible implementation modes, the method for detecting body keypoints may be implemented by a processor by invoking computer-readable instructions stored in a memory. As shown in FIG. 2, the process may include the following steps.

In S201, data alignment preprocessing is performed on each frame of image in an RGB image data stream and depth data that corresponds to the fame of image to obtain an RGBD image data stream.

In an example, for the data preprocessing, the RGB data and the depth data are aligned to obtain RGBD data; and then, the RGB data and the RGBD data are respectively processed in the flowchart of the method.

In S202, in response to detecting that an image includes a body from the RGB image data stream, 2D coordinate data for identifying body keypoint positions are extracted in the image to obtain 2D pose data.

In S203, depth data are acquired from the RGBD image data stream, and body keypoint feature fusion is performed on the 2D pose data and depth data (depth data corresponding to the body keypoint positions) to obtain 3D pose data for identifying the body keypoint positions.

Through the present disclosure, after preprocessing, each data pair formed by a RGB and a RGBD is an image frame corresponding to the same view. Body keypoints of each frame of image in the RGB image data stream are aligned to depth data of body keypoints corresponding to the same image, so that for any one body keypoint in the image, both a 2D coordinate for characterizing a position of the body keypoint and a distance value for characterizing a change of movement of the body keypoint are obtained, and thus 3D information for the body keypoint position is obtained. The depth data are acquired from a DepthMap. In an acquisition scene including a camera or a camera module, the Depth-Map may be considered as: an image (or referred as an image channel) that includes information on the distance to a surface of a target object acquired in the scene. When the distance of at least one point relative to the camera or the camera module in the scene is represented by a DepthMap, each pixel value in the DepthMap may represent a distance between a point and the camera in the scene.

In a possible implementation mode of the present disclosure, the operation of detecting that the image includes the body may include that: the RGB image data stream is acquired, and first image processing is performed on each frame of image in the RGB image data stream. For a present frame of image, multiple image features are obtained after the first image processing. In the case of determining that the multiple image features are body keypoint features using a body identification network, it is detected that the present frame of image includes the body till detection on at least one frame of image is completed.

In a possible implementation mode of the present disclosure, before the body keypoint feature fusion is performed on the 2D pose data and the depth data corresponding to the body keypoint positions, the method may further include that the RGBD image data stream is acquired, and second image processing is performed on each frame of image in the RGBD image data stream. For a present frame of image, multiple depth data are obtained after the second image processing is performed till image processing on at least one frame of image is completed.

In an example, the data aligned preprocessing is to obtain multiple RGBD data streams according to multiple RGB data streams. Body keypoints of each frame of image in the RGB data stream may be aligned to depth data of body keypoints corresponding to the same image; and if both the RGB and RGBD are considered as data, each RGB and RGBD constitute a data pair, and they are image frames corresponding to the same view. Multiple RGB and RGBD data pairs may be input after the data alignment preprocessing. For example, the data pairs may be input in two types to operate a logic model in the body keypoint detection process. For the first type of data (RGB data), after the first image processing, whether a human body is detected in the present image frame is determined by using a trained body tracking network; and if the body is detected, corresponding target RGB data in the present image frame are processed in a subsequent step. In the subsequent step, for the second type of data (RGBD data), after the second image processing, the RGBD data are fused with the target RGB data to obtain 3D pose data (3D coordinates of body skeleton keypoints) according to the RGBD data and the target RGB data. Dynamic tracking includes: using the 3D coordinates to represent the 3D pose data of the body skeleton keypoints to implement tracking when the body is in the motion state, such as tracking a change of node pose pairs, which supports at least one body action of raising the hand, kicking the leg, shaking the head, bending down, etc.

In an example, a processing logic that operates the body keypoint detection process of the present disclosure may be integrated to a mobile phone in an offline Software Development Kit (SDK) manner. Based on algorithm optimization with the mobile phone as the mobile terminal, the operating speed of the processing logic may be accelerated. Different from a Client/Server (C/S) online mode in the conventional art, the processing logic is provided at the server. In this way, if the terminal initiates a request to the server, the processing result requested by the terminal cannot be obtained timely due to a transmission delay, or a network fault or the like therebetween. In the present disclosure, the processing logic is directly provided at the terminal in an offline mode of the SDK, which greatly improves the processing efficiency of the detection method.

Figure 3:
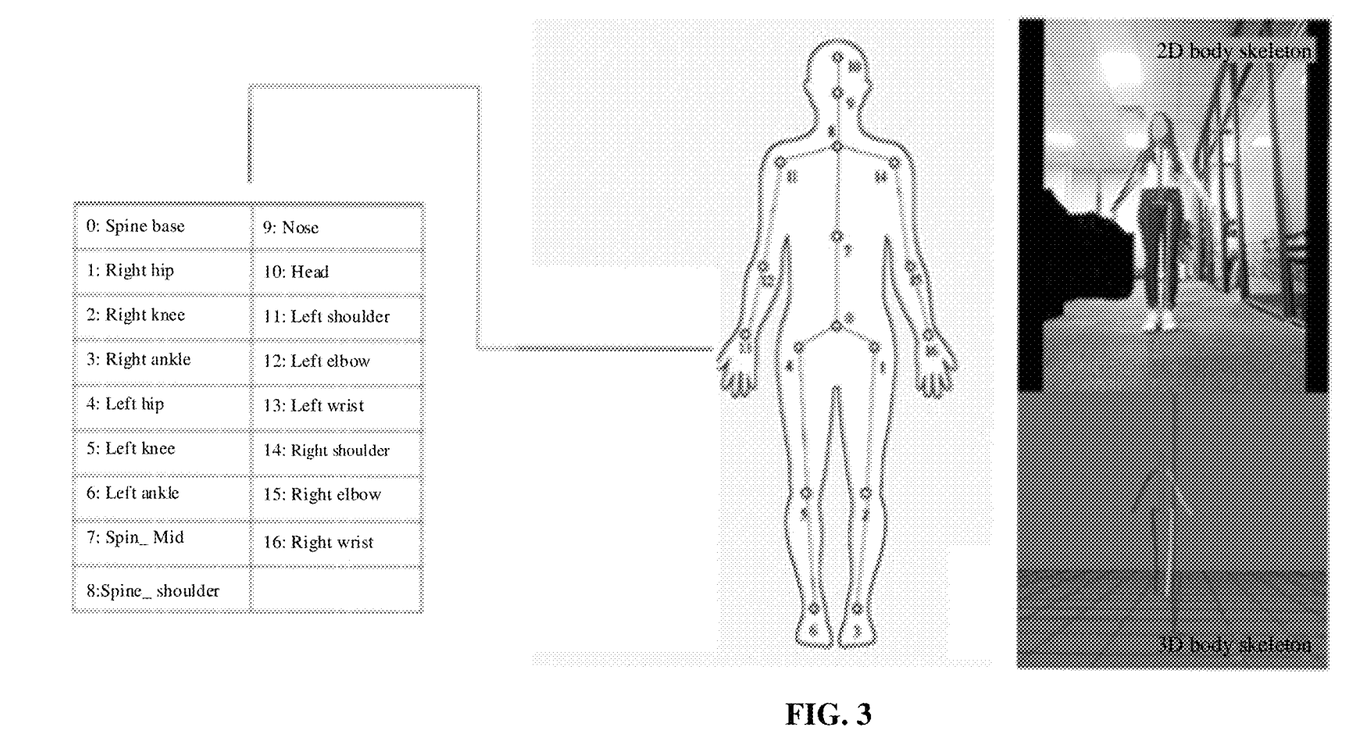
FIG. 3 illustrates a schematic diagram of body skeleton keypoints according to an embodiment of the present disclosure.

FIG. 3 illustrates a schematic diagram of body skeleton keypoints according to an embodiment of the present disclosure. The body skeleton includes the number of 17 keypoints; and by detection of the 17 keypoints, a dynamic pose change of the user, such as at least one body action of raising the hand, kicking the leg, shaking the head, bending down and the like, may be tracked in real time.

Figure 4:
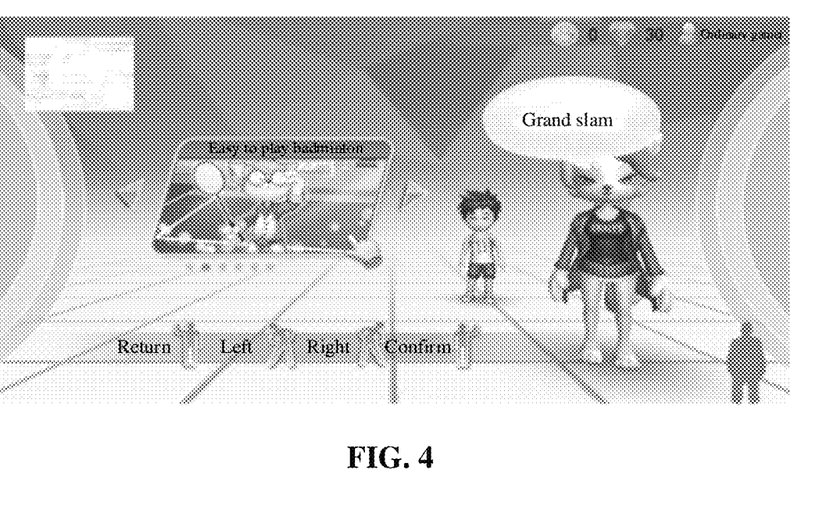
FIG. 4 illustrates a diagram of a scene where a user holding a mobile phone terminal interacts with a large-screen device such as a television according to an embodiment of the present disclosure.

For instance, in a scenario on how the user holding the mobile phone terminal interacts with a large-screen device such as a television, a first body motion state (such as a swing action when the user plays tennis) is acquired; and a change of body keypoint positions corresponding to the first body motion state is described through first 3D pose data. A first control instruction is generated according to the first 3D pose data, and the first control instruction is sent to a receiving side device, so as to display an action simulating operation corresponding to the first body motion state on a display screen of the receiving side device. The above is merely an example, and other interactive scenarios are also applicable to the present disclosure. For a motion sensing game at the mobile phone terminal, using a motion sensing game machine such as Xbox and Switch in related art needs to additionally purchase a device, such that the use cost and the space cost are higher relative to use of the mobile phone terminal. Through the present disclosure, the user can pay games by connecting the screen as long as he/she has a Time of Flight (ToF) mobile phone. At the meantime, using a 3D body coordinate detection technology allows to obtain a richer gaming content. The ToF mobile phone may be provided with a ToF module, the 3D imaging solution of which may be that light pulses are continuously sent to the target object, and then the light reflected from the target object is received by the sensors; and a distance between the target object and the collected position is obtained by detecting the flight (return) time of the light pulses.

FIG. 4 illustrates a diagram of a scenario where a user holding a mobile phone terminal interacts with a large-screen device such as a television according to an embodiment of the present disclosure. The scenario is an interactive scene where the user plays the badminton. The changes in the present pose of a user may be tracked by detecting the body skeleton keypoints of the user, the obtained pose changes are transmitted back to an electronic device such as the television, and the corresponding pose changes are displayed in the electronic device.

For instance, when the user holding the mobile phone takes exercise, in a scene on how to correct the exercise pose, a second body motion state (for example, the user tries to raise both hands to form 90° with the horizontal plane) is acquired, and the change of body keypoint positions corresponding to the second body motion state is described through second 3D pose data. The second 3D pose data are compared with pre-configured pose data, a second control instruction is generated in the case of an inconsistent comparison result (for instance, the user only raises both hands to 85° with the horizontal plane, which is not consistent to the pre-configured pose data "90°"), and prompt information is sent according to the second control instruction, so as to adjust the second body motion state to a target state according to the prompt information. The prompt information includes: voice, characters, sound, light and electricity, and other information for prompting the user to notice that the present motion pose is completely wrong or the pose is not in place, etc. The above is merely an example, and other exercise pose correction scenarios are also applicable to the present disclosure. For example, a virtual trainer software in the fitness industry may be developed based on the present disclosure, through which exercise actions of the user is detected by a mobile phone or similar 3D modules, and then guidance is given accordingly.

Figure 5:
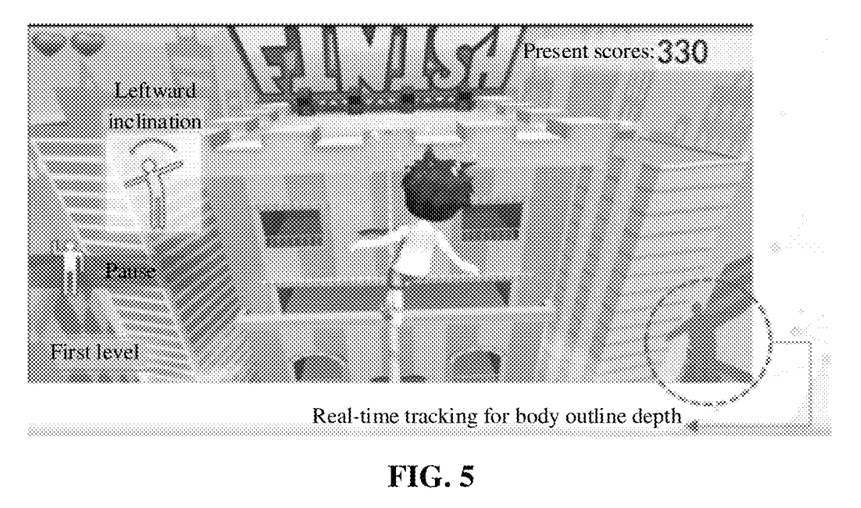
FIG. 5 illustrates a diagram of a scene where a virtual avatar is generated according to an embodiment of the present disclosure.

For example, in a scene where body data of the user are applied to a virtual avatar, a third body motion state (such as a pose that the user runs) is acquired, and a change of body keypoint positions corresponding to the third body motion state is described through third 3D pose data. The third 3D pose data are sent to a receiving side device, so as to display, on a display screen of the receiving side device, operations that the virtual avatar sampling the third 3D pose data (the virtual avatar may be that a small animal, a boy or a girl is running in the game scene). The above is merely an example, and other virtual avatars are also applicable to the present disclosure. For example, a virtual game may be developed based on the present disclosure, in which a virtual avatar is driven by capture of user actions in real time to replace a real person in the game scene, and this is an interactive manner over a touch screen. FIG. 5 illustrates a diagram of a scene where a virtual avatar is generated according to an embodiment of the present disclosure. The scene is a parkour scene, in which data of the pose change of the virtual avatar in the electronic device such as the television may be generated by detecting the body skeleton keypoints of the user, and the respective pose change is displayed in the electronic device.

In a possible implementation mode of the present disclosure, a training process of the body identification network may include that: pre-labeled body keypoint features are taken as training sample data, the training sample data are input to a to-be-trained body identification network (such as CNN) for training till an output result meets network training conditions, and a trained body identification network is obtained after the training. The body keypoint features in the image may be extracted via the CNN; and an algorithmic model trained according to a labeled dataset of the body skeleton keypoints is used to identify whether a human body is contained in the images. By virtue of the excellent performance of the deep learning algorithm and with utilization of the depth data, the accurate node pose can be obtained, and the change of the node pose pair is tracked in real time to support at least one body action of raising hand, kicking leg, shaking head, bending down and the like.

Application Example

Figure 6:
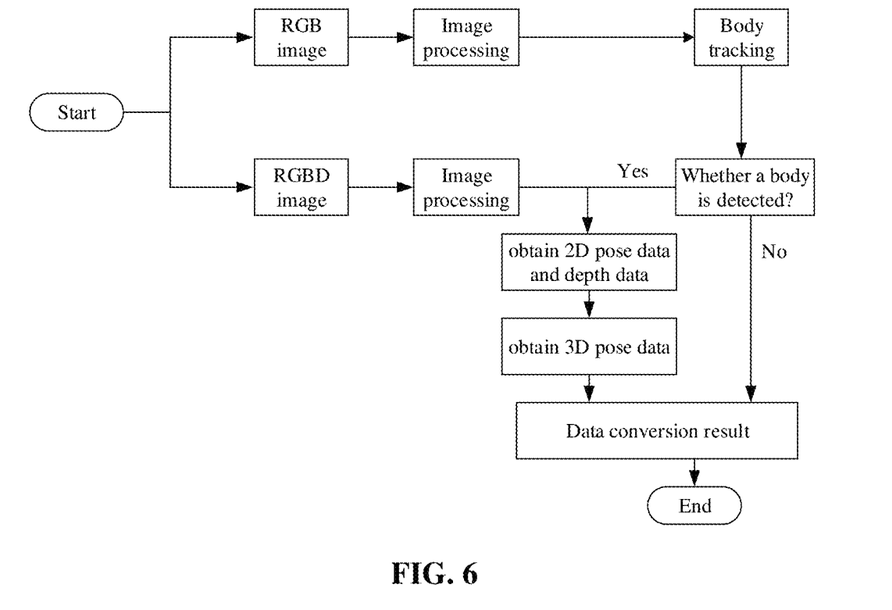
FIG. 6 illustrates a schematic diagram of a body detection solution according to an embodiment of the present disclosure.

FIG. 6 illustrates a schematic diagram of a body detection solution according to an embodiment of the present disclosure. In FIG. 6, image processing is respectively performed on two image data streams such as an RGB image data stream and an RGBD image data stream. For the processing on the RGB image data stream, whether a human body is detected in a present RGB image frame is determined after image processing; and if the body is detected, target RGB data corresponding to the present RGB image frame are delivered to the subsequent processing on the RGBD image data stream for processing. For the processing on the RGBD image data stream, target RGBD data (depth data) obtained after image processing are fused with the target RGB image (2D pose data) to obtain 3D pose data according to the 2D pose data and the depth data, i.e., 3D coordinates of body skeleton keypoints; and data conversion is performed on the 3D pose data to obtain a data conversion result for detection processing in at least one scene.

It may be understood by the person skilled in the art that in the method of the specific implementation modes, the writing sequence of various steps does not mean a strict execution sequence to form any limit to the implementation process, and the specific execution sequence of various steps may be determined in terms of the function and possible internal logic.

The method embodiments mentioned in the present disclosure may be combined with each other to form a combined embodiment without departing from the principle and logic, which is not elaborated in the embodiments of the present disclosure for the sake of simplicity.

In addition, the present disclosure further provides an apparatus for detecting body keypoints, an electronic device, a computer-readable storage medium and a program, all of which may be configured to implement any method for detecting body keypoints provided by the present disclosure. The corresponding technical solutions and descriptions refer to the corresponding descriptions in the method and will not be elaborated herein.

Figure 7:
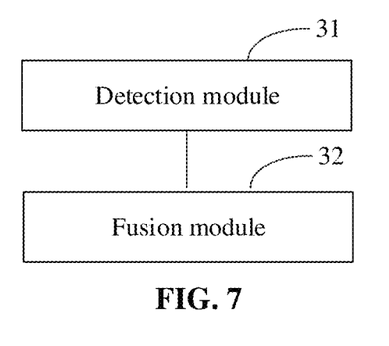
FIG. 7 illustrates a block diagram of an apparatus for detecting body keypoints according to an embodiment of the present disclosure.

FIG. 7 illustrates a block diagram of an apparatus for detecting body keypoints according to an embodiment of the present disclosure. As shown in FIG. 7, the apparatus for detecting body keypoints in the embodiment of the present disclosure may include: a detection module 31, configured to extract, in response to detecting that an image includes a body, 2D coordinate data for identifying body keypoint positions in the image obtain 2D pose data; and a fusion module 32, configured to perform body keypoint feature fusion on the 2D pose data and depth data that corresponds to the body keypoint positions to obtain 3D pose data for identifying the body keypoint positions.

In a possible implementation mode, the apparatus may further include: a preprocessing module, configured to: perform data alignment preprocessing on each frame of image in an RGB image data stream and depth data corresponding to the each frame of image to obtain an RGBD image data stream.

In a possible implementation mode, the detection module is further configured to: obtain, for a present frame of image, multiple image features after first image processing; and in the case of determining according to a body identification network that the multiple image features are body keypoint features, detect that the present frame of image includes the body till detection on at least one frame of image is completed.

In a possible implementation mode, the apparatus may further include: an image processing module, configured to: obtain, for the present frame of image, multiple depth data after second image processing till image processing on at least one frame of image is completed.

In a possible implementation mode, the apparatus may further include: a first pose acquisition module, configured to acquire a first body motion state; a first data description module, configured to describe a change of body keypoint positions corresponding to the first body motion state through first 3D pose data; and a first instruction sending module, configured to generate a first control instruction according to the first 3D pose data, and send the first control instruction to a receiving side device, so as to display an action simulating operation corresponding to the first body motion state on a display screen of the receiving side device.

In a possible implementation mode, the apparatus may further include: a second pose acquisition module, configured to acquire a second body motion state; a second data description module, configured to describe, through second 3D pose data, a change of body keypoint positions corresponding to the second body motion state; a data comparison module, configured to compare the second 3D pose data with pre-configured pose data, and generate a second control instruction in the case of an inconsistent comparison result; and a prompt information sending module, configured to send prompt information according to the second control instruction, so as to adjust the second body motion state to a target state according to the prompt information.

In a possible implementation mode, the apparatus may further include: a third pose acquisition module, configured to acquire a third body motion state; a third data description module, configured to describe, through third 3D pose data, a change of body keypoint positions corresponding to the third body motion state; and a second instruction sending module, configured to send the third 3D pose data to a receiving side device, so as to display, on a display screen of the receiving side device, operations that a virtual avatar sampling the third 3D pose data.

In a possible implementation mode, the apparatus may further include: a network training module, configured to: take pre-labeled body keypoint features as training sample data in a training process of the body identification network, input the training sample data to a to-be-trained body identification network for training till an output result meets network training conditions, and obtain a trained body identification network.

In some embodiments, the function or included module of the apparatus provided by the embodiment of the present disclosure may be configured to execute the method described in the above method embodiments, and the specific implementation may refer to the description in the above method embodiments. For the simplicity, the details are not elaborated herein.

An embodiment of the present disclosure further provides a computer-readable storage medium, which stores computer program instructions thereon; and the computer program instructions, when being executed by a processor, cause to execute the method for detecting body keypoints. The computer-readable storage medium may be a non-transitory computer-readable storage medium.

An embodiment of the disclosure further provides an electronic device, which may include: a processor; and a memory configured to store instructions executable by the processor, where the processor is configured to execute the method for detecting body keypoints as described above.

The electronic device may be provided as a terminal, a server or other types of devices.

An embodiment of the present disclosure further provides a computer program, which may include a computer-readable code; and when the computer-readable code, when running in an electronic device, enables a processor in the electronic device executes the method for detecting body keypoints as described above.

Figure 8:
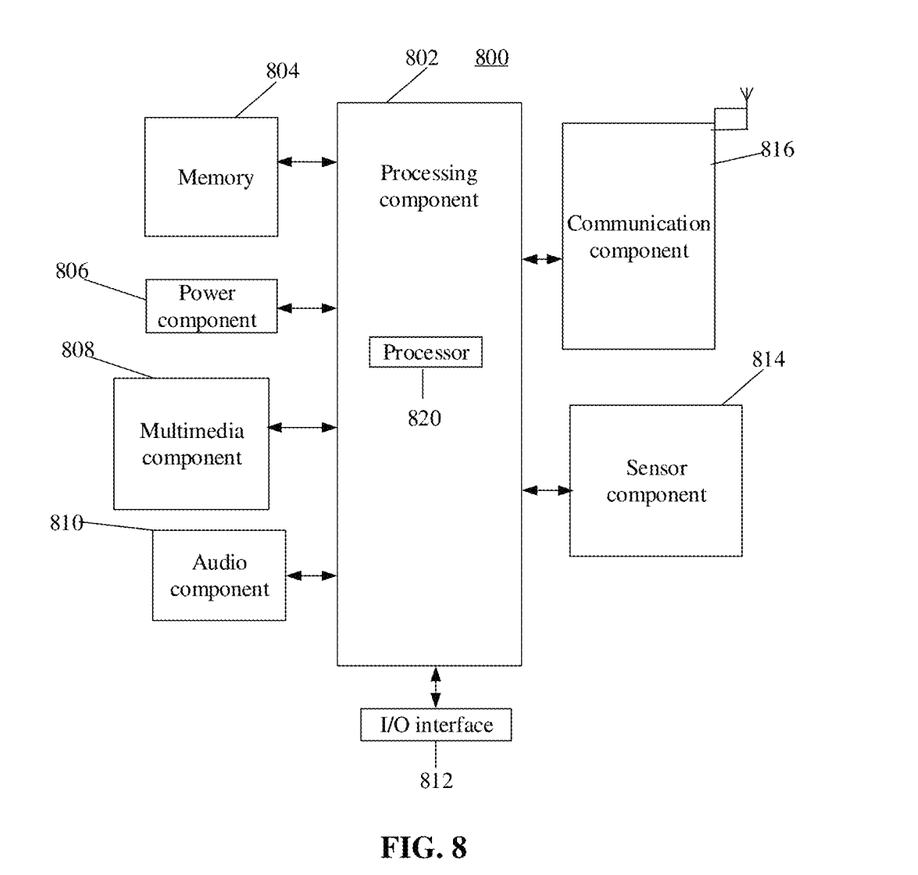
FIG. 8 illustrates a block diagram of an electronic device according to an embodiment of the present disclosure.

FIG. 8 illustrates a block diagram of an electronic device 800 according to an exemplary embodiment. For example, the electronic device 800 may be a terminal such as a mobile phone, a computer, a digital broadcast terminal, a messaging device, a gaming console, a tablet, a medical device, exercise equipment and a PDA.

Referring to FIG. 8, the electronic device 800 may include one or more of the following components: a processing component 802, a memory 804, a power component 806, a multimedia component 808, an audio component 810, an Input/Output (I/O) interface 812, a sensor component 814, and a communication component 816.

The processing component 802 typically controls overall operations of the electronic device 800, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the electronic device 800. Examples of such data include instructions for any application or method operated on the electronic device 800, contact data, phonebook data, messages, pictures, videos, etc. The memory 804 may be implemented by using any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The power component 806 provides power to various components of the electronic device 800. The power component 806 may include a power management system, one or more power sources, and any other components associated with the generation, management, and distribution of power in the electronic device 800.

The multimedia component 808 includes a screen providing an output interface between the electronic device 800 and the user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also sense a period of time and a pressure associated with the touch or swipe action. In some embodiments, the multimedia component 808 includes a front camera and/or a rear camera. The front camera and/or the rear camera may receive external multimedia data when the electronic device 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone (MIC) configured to receive an external audio signal when the electronic device 800 is in an operation mode, such as a call mode, a recording mode, and a voice recognition mode. The received audio signal may further be stored in the memory 804 or transmitted via the communication component 816. In some embodiments, the audio component 810 further includes a speaker configured to output audio signals.

The I/O interface 812 provides an interface between the processing component 802 and peripheral interface modules. The peripheral interface modules may be a keyboard, a click wheel, buttons, and the like. The buttons may include, but are not limited to, a home button, a volume button, a starting button, and a locking button.

The sensor component 814 includes one or more sensors to provide status assessments of various aspects of the electronic device 800. For instance, the sensor component 814 may detect an on/off status of the electronic device 800 and relative positioning of components, such as a display and small keyboard of the electronic device 800, and the sensor component 814 may further detect a change in a position of the electronic device 800 or a component of the electronic device 800, presence or absence of contact between the user and the electronic device 800, orientation or acceleration/deceleration of the electronic device 800 and a change in temperature of the electronic device 800. The sensor component 814 may include a proximity sensor, configured to detect the presence of nearby objects without any physical contact. The sensor component 814 may also include a light sensor, such as a Complementary Metal Oxide Semiconductor (CMOS) or Charge Coupled Device (CCD) image sensor, configured for use in an imaging application. In some embodiments, the sensor component 814 may also include an accelerometer sensor, a gyroscope sensor, a magnetic sensor, a pressure sensor, or a temperature sensor.

The communication component 816 is configured to facilitate wired or wireless communication between the electronic device 800 and another device. The electronic device 800 may access a communication-standard-based wireless network, such as a Wireless Fidelity (WiFi) network, a 2nd-Generation (2G) or 3rd-Generation (3G) network or a combination thereof. In one exemplary embodiment, the communication component 816 receives a broadcast signal or broadcast associated information from an external broadcast management system via a broadcast channel. In one exemplary embodiment, the communication component 816 further includes a near field communication (NFC) module to facilitate short-range communications. For example, the NFC module may be implemented based on a Radio Frequency Identification (RFID) technology, an Infrared Data Association (IrDA) technology, an Ultra-Wideband (UWB) technology, a Bluetooth (BT) technology, and other technologies.

Exemplarily, the electronic device 800 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In an exemplary embodiment, a non-transitory computer-readable storage medium, for example, a memory 804 including computer program instructions, is also provided. The computer program instructions may be executed by a processing component 820 of an electronic device 800 to implement the abovementioned method.

Figure 9:
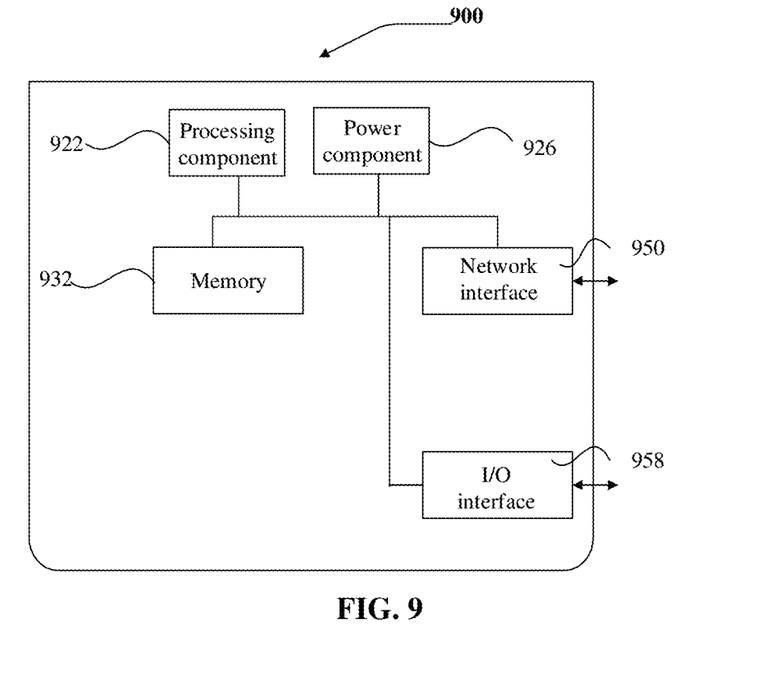
FIG. 9 illustrates a block diagram of an electronic device according to an embodiment of the present disclosure.

FIG. 9 illustrates a block diagram of an electronic device 900 according to an exemplary embodiment. For example, the electronic device 900 may be provided as a server. Referring to FIG. 9, the electronic device 900 includes a processing component 922, further including one or more processors, and a memory resource represented by a memory 932, configured to store instructions executable by the processing component 922, for example, an application program. The application program stored in the memory 932 may include one or more modules, with each module corresponding to one group of instructions. In addition, the processing component 922 is configured to execute the instructions to implement the abovementioned method.

The electronic device 900 may further include a power component 926 configured to execute power management of the electronic device 900, a wired or wireless network interface 950 configured to connect the electronic device 1900 to a network and an I/O interface 958. The electronic device 900 may be operated based on an operating system stored in the memory 932, for example, Windows Server™, Mac OS X™, Unix™, Linux™, FreeBSD™ or the like.

In an exemplary embodiment, a non-transitory computer-readable storage medium, for example, a memory 932 including computer program instructions, is also provided. The computer program instructions may be executed by a processing component 922 of an electronic device 900 to implement the abovementioned method.

In the present disclosure, in response to detecting that the image includes the body, the 2D coordinate data for identifying the body keypoint positions are extracted in the image to obtain the 2D pose data. The body keypoint feature fusion is performed on the 2D pose data and the depth data corresponding to the body keypoint positions to obtain the 3D pose data for identifying the body keypoint positions. Through the present disclosure, the 2D coordinate data for identifying the body keypoint positions are extracted in the image, such that the 2D pose data may be obtained. The body keypoint feature fusion is performed on the 2D pose data and the depth data corresponding to the body keypoint positions to obtain the 3D pose data which are 3D coordinate data for identifying the body keypoint positions. Therefore, by identifying the 3D coordinate data at the body keypoint positions, accurate detection of keypoints of a human body can be implemented when the human body is in a motion state.

The disclosure may be a system, a method and/or a computer program product. The computer program product may include a computer-readable storage medium, in which computer-readable program instructions configured to enable a processor to implement various aspects of the disclosure is stored The computer-readable storage medium may be a physical device capable of retaining and storing instructions used by an instruction execution device. The computer-readable storage medium may be, but not limited to, an electric storage device, a magnetic storage device, an optical storage device, an electromagnetic storage device, a semiconductor storage device or any appropriate combination thereof. More specific examples (non-exhaustive list) of the computer-readable storage medium include a portable computer disk, a hard disk, a Random Access Memory (RAM), a ROM, an EPROM (or a flash memory), an SRAM, a Compact Disc Read-Only Memory (CD-ROM), a Digital Video Disk (DVD), a memory stick, a floppy disk, a mechanical coding device, a punched card or in-slot raised structure with an instruction stored therein, and any appropriate combination thereof. Herein, the computer-readable storage medium is not explained as a transient signal, for example, a radio wave or another freely propagated electromagnetic wave, an electromagnetic wave propagated through a wave guide or another transmission medium (for example, a light pulse propagated through an optical fiber cable) or an electric signal transmitted through an electric wire.

The computer-readable program instruction described here may be downloaded from the computer-readable storage medium to each computing/processing device or downloaded to an external computer or an external storage device through a network such as an Internet, a Local Area Network (LAN), a Wide Area Network (WAN) and/or a wireless network. The network may include a copper transmission cable, an optical fiber transmission cable, a wireless transmission cable, a router, a firewall, a switch, a gateway computer and/or an edge server. A network adapter card or network interface in each computing/processing device receives the computer-readable program instructions from the network and forwards the computer-readable program instructions to be stored in the computer-readable storage medium in each computing/processing device.

The computer program instructions configured to execute the operations of the disclosure may be an assembly instruction, an Instruction Set Architecture (ISA) instruction, a machine instruction, a machine related instruction, a microcode, a firmware instruction, state setting data or a source code or target code edited by one or any combination of more programming languages, the programming language including an object-oriented programming language such as Smalltalk and C++ and a conventional procedural programming language such as "C" language or a similar programming language. The computer-readable program instructions may be completely or partially executed in a computer of a user, executed as an independent software package, executed partially in the computer of the user and partially in a remote computer, or executed completely in the remote server or a server. In a case involved in the remote computer, the remote computer may be connected to the user computer via a type of network including the LAN or the WAN, or may be connected to an external computer (such as using an Internet service provider to provide the Internet connection). In some embodiments, an electronic circuit, such as a programmable logic circuit, a Field Programmable Gate Array (FPGA) or a Programmable Logic Array (PLA), is customized by using state information of the computer-readable program instructions. The electronic circuit may execute the computer-readable program instructions to implement each aspect of the disclosure.

Herein, each aspect of the disclosure is described with reference to flowcharts and/or block diagrams of the method, device (system) and computer program product according to the embodiments of the disclosure. It is to be understood that each block in the flowcharts and/or the block diagrams and a combination of each block in the flowcharts and/or the block diagrams may be implemented by computer-readable program instructions.

These computer-readable program instructions may be provided for a universal computer, a dedicated computer or a processor of another programmable data processing device, thereby generating a machine to further generate a device that realizes a function/action specified in one or more blocks in the flowcharts and/or the block diagrams when the instructions are executed through the computer or the processor of the other programmable data processing device. These computer-readable program instructions may also be stored in a computer-readable storage medium, and through these instructions, the computer, the programmable data processing device and/or another device may work in a specific manner, so that the computer-readable medium including the instructions includes a product including instructions for implementing various aspects of the function/action specified in one or more blocks in the flowcharts and/or the block diagrams.

These computer-readable program instructions may further be loaded to the computer, the other programmable data processing device or the other device, so that a series of operating steps are executed in the computer, the other programmable data processing device or the other device to generate a process implemented by the computer to further realize the function/action specified in one or more blocks in the flowcharts and/or the block diagrams by the instructions executed in the computer, the other programmable data processing device or the other device.

The flowcharts and block diagrams in the drawings illustrate probably implemented system architectures, functions and operations of the system, method and computer program product according to multiple embodiments of the disclosure. On this aspect, each block in the flowcharts or the block diagrams may represent part of a module, a program segment or an instruction, and part of the module, the program segment or the instruction includes one or more executable instructions configured to realize a specified logical function. In some alternative implementations, the functions marked in the blocks may also be realized in a sequence different from those marked in the drawings. For example, two continuous blocks may actually be executed in a substantially concurrent manner and may also be executed in a reverse sequence sometimes, which is determined by the involved functions. It is further to be noted that each block in the block diagrams and/or the flowcharts and a combination of the blocks in the block diagrams and/or the flowcharts may be implemented by a dedicated hardware-based system configured to execute a specified function or operation or may be implemented by a combination of a special hardware and a computer instruction.

Each embodiment of the disclosure has been described above. The above descriptions are exemplary, non-exhaustive and also not limited to each disclosed embodiment. Many modifications and variations are apparent to those of ordinary skill in the art without departing from the scope and spirit of each described embodiment of the disclosure. The terms used herein are selected to explain the principle and practical application of each embodiment or technical improvements in the technologies in the market best or enable others of ordinary skill in the art to understand each embodiment disclosed herein.

The invention claimed is:

1. A method for detecting body keypoints, comprising;
    extracting, in response to detecting that an image comprises a body, two-dimensional (2D) coordinate data for identifying body keypoint positions in the image to obtain 2D pose data; and
    performing body keypoint feature fusion on the 2D pose data and depth data corresponding to the body keypoint positions to obtain three-dimensional (3D) pose data for identifying the body keypoint positions,
    the method further comprising:
        acquiring a first body motion state; describing, through first 3D pose data, a change of body keypoint positions corresponding to the first body motion state; and generating a first control instruction according to the first 3D pose data, and sending the first control instruction to a receiving side device, so as to display an action simulating operation corresponding to the first body motion state on a display screen of the receiving side device,
        or
        acquiring a second body motion state; describing, through second 3D pose data, a change of body keypoint positions corresponding to the second body motion state; comparing the second 3D pose data with pre-configured pose data, and generating a second control instruction in response to an inconsistent comparison result; and sending prompt information according to the second control instruction, so as to adjust the second body motion state to a target state according to the prompt information, or
acquiring a third body motion state; describing, through third 3D pose data, a change of body keypoint positions corresponding to the third body motion state; and sending the third 3D pose data to the receiving side device, so as to display, on the display screen of the receiving side device, operations of a virtual avatar sampling the third 3D pose data.

2. The method of claim 1, wherein before performing the body keypoint feature fusion on the 2D pose data and the depth data corresponding to the body keypoint positions, the method further comprises:
performing data alignment preprocessing on each frame of image in a Red Green Blue (RGB) image data stream and depth data corresponding to the each frame of image to obtain an RGB depth (RGBD) image data stream.

3. The method of claim 2, wherein before performing body keypoint feature fusion on the 2D pose data and the depth data that corresponds to the body keypoint positions, the method further comprises:
obtaining multiple depth data by performing second image processing on a present frame of image till image processing on at least one frame of image is completed.

4. The method of claim 1, wherein detecting that the image comprises the body comprises:
obtaining multiple image features by performing first image processing on a present frame of image; and
in response to determining that the multiple image features are body keypoint features by using a body identification network, detecting that the present frame of image comprises the body till detection on at least one frame of image is completed.

5. The method of claim 4, wherein a training process of the body identification network comprises:
taking pre-labeled body keypoint features as training sample data, inputting the training sample data to a to-be-trained body identification network for training till an output result meets a network training condition, and obtaining a trained body identification network.

6. An apparatus for detecting body keypoints, comprising;
a processor; and
a memory configured to store instructions executable by the processor,
wherein the processor is configured to:
extract, in response to detecting that an image comprises a body, two-dimensional (2D) coordinate data for identifying body keypoint positions in the image to obtain 2D pose data; and
perform body keypoint feature fusion on the 2D pose data and depth data corresponding to the body keypoint positions to obtain three-dimensional (3D) pose data for identifying the body keypoint positions,
wherein the processor is further configured to:
acquire a first body motion state; describe, through first 3D pose data, a change of body keypoint positions corresponding to the first body motion state; and generate a first control instruction according to the first 3D pose data, and send the first control instruction to a receiving side device, so as to display an action simulating operation corresponding to the first body motion state on a display screen of the receiving side device,
or
acquire a second body motion state; describe, through second 3D pose data, a change of body keypoint positions corresponding to the second body motion state; compare the second 3D pose data with pre-configured pose data, and generate a second control instruction in response to an inconsistent comparison result; and send prompt information according to the second control instruction, so as to adjust the second body motion state to a target state according to the prompt information,
or
acquire a third body motion state; describe, through third 3D pose data, a change of body keypoint positions corresponding to the third body motion state; and send the third 3D pose data to the receiving side device, so as to display, on the display screen of the receiving side device, operations of a virtual avatar sampling the third 3D pose data.

7. The apparatus of claim 6, wherein the processor is further configured to:
perform data alignment preprocessing on each frame of image in a Red Green Blue (RGB) image data stream and depth data corresponding to the each frame of image to obtain an RGB depth (RGBD) image data stream.

8. The apparatus of claim 7, wherein the processor is further configured to:
obtain multiple image features by performing first image processing on a present frame of image; and
in response to determining that the multiple image features are body keypoint features by using a body identification network, detect that the present frame of image comprises the body till detection on at least one frame of image is completed.

9. The apparatus of claim 8, wherein the processor is further configured to:
take pre-labeled body keypoint features as training sample data in a training process of the body identification network, input the training sample data to a to-be-trained body identification network for training till an output result meets a network training condition, and obtain a trained body identification network.

10. The apparatus of claim 7, wherein the processor is further configured to:
obtain multiple depth data by performing second image processing on a present frame of image till image processing on at least one frame of image is completed.

11. A non-transitory computer-readable storage medium, having computer program instructions stored thereon, wherein the computer program instructions, when being executed by a processor, cause to implement operations, the operations comprising:
extracting, in response to detecting that an image comprises a body, two-dimensional (2D) coordinate data for identifying body keypoint positions in the image to obtain 2D pose data; and
performing body keypoint feature fusion on the 2D pose data and depth data corresponding to the body keypoint positions to obtain three-dimensional (3D) pose data for identifying the body keypoint positions,
the operations further comprising:
acquiring a first body motion state; describing, through first 3D pose data, a change of body keypoint positions corresponding to the first body motion state; and generating a first control instruction according to the first 3D pose data, and sending the first control instruction to a receiving side device, so as to display an action simulating operation corresponding to the first body motion state on a display screen of the receiving side device, or acquiring a second body motion state; describing, through second 3D pose data, a change of body keypoint positions corresponding to the second body motion state; comparing the second 3D pose data with pre-configured pose data, and generating a second control instruction in response to an inconsistent comparison result; and sending prompt information according to the second control instruction, so as to adjust the second body motion state to a target state according to the prompt information, or acquiring a third body motion state; describing, through third 3D pose data, a change of body keypoint positions corresponding to the third body motion state; and sending the third 3D pose data to the receiving side device, so as to display, on the display screen of the receiving side device, operations of a virtual avatar sampling the third 3D pose data.

12. The non-transitory computer-readable storage medium of claim 11, wherein before performing the body keypoint feature fusion on the 2D pose data and the depth data corresponding to the body keypoint positions, the operations further comprise:

performing data alignment preprocessing on each frame of image in a Red Green Blue (RGB) image data stream and depth data corresponding to the each frame of image to obtain an RGB depth (RGBD) image data stream.

13. The non-transitory computer-readable storage medium of claim 12, wherein before performing body keypoint feature fusion on the 2D pose data and the depth data that corresponds to the body keypoint positions, the operations further comprise:

obtaining multiple depth data by performing second image processing on a present frame of image till image processing on at least one frame of image is completed.

14. The non-transitory computer-readable storage medium of claim 11, wherein the operation of detecting that the image comprises the body comprises:

obtaining multiple image features by performing first image processing on a present frame of image; and in response to determining that the multiple image features are body keypoint features by using a body identification network, detecting that the present frame of image comprises the body till detection on at least one frame of image is completed.

15. The non-transitory computer-readable storage medium of claim 14, wherein a training process of the body identification network comprises:

taking pre-labeled body keypoint features as training sample data, inputting the training sample data to a to-be-trained body identification network for training till an output result meets a network training condition, and obtaining a trained body identification network.

* * * * *